(12) United States Patent
Neuhaus et al.

(10) Patent No.: US 9,472,998 B2
(45) Date of Patent: Oct. 18, 2016

(54) LINEAR ACTUATOR

(71) Applicant: Johnson Electric S.A., Murten (CH)

(72) Inventors: Bruno Neuhaus, Wallenried (CH);
Michael Watzek, Courgevaux (CH);
Miha Furlan, Bern (CH)

(73) Assignee: JOHNSON ELECTRIC S.A., Murten (CH)

( * ) Notice: Subject to any disclaimer, the term of this patent is extended or adjusted under 35 U.S.C. 154(b) by 416 days.

(21) Appl. No.: 14/099,069

(22) Filed: Dec. 6, 2013

(65) Prior Publication Data

US 2014/0167539 A1 Jun. 19, 2014

(30) Foreign Application Priority Data

Dec. 13, 2012 (GB) .................................. 1222496.0

(51) Int. Cl.
| H02K 7/06 | (2006.01) |
| H02K 7/08 | (2006.01) |
| H02K 5/16 | (2006.01) |

(52) U.S. Cl.
CPC ............... *H02K 7/08* (2013.01); *H02K 5/161* (2013.01); *H02K 7/06* (2013.01); *H02K 7/088* (2013.01); *H02K 2205/03* (2013.01)

(58) Field of Classification Search
CPC .......... H02K 5/161; H02K 7/00; H02K 7/06; H02K 7/08; H02K 1/14; H02K 5/00; H02K 5/17; H02K 37/12; H02K 37/14; F16C 35/04; F21V 21/26
See application file for complete search history.

(56) References Cited

U.S. PATENT DOCUMENTS

| 3,161,447 | A | | 12/1964 | Larsson | |
|---|---|---|---|---|---|
| 4,049,985 | A | | 9/1977 | Sudler | |
| 4,800,306 | A | | 1/1989 | Oberto | |
| 4,987,791 | A | * | 1/1991 | Nakahashi | B60S 1/08 74/425 |
| 5,811,903 | A | * | 9/1998 | Ueno | F16C 17/08 310/40 MM |
| 6,581,903 | B2 | * | 6/2003 | Yokoyama | H02K 7/06 123/568.24 |
| 6,888,277 | B2 | | 5/2005 | Watzek et al. | |
| 7,023,115 | B2 | * | 4/2006 | Matsushita | F16C 19/163 310/43 |
| 7,679,244 | B2 | * | 3/2010 | Agematsu | H02K 5/1672 310/216.001 |
| 7,682,045 | B2 | * | 3/2010 | Pfister | H02K 7/06 310/20 |
| 7,893,571 | B2 | * | 2/2011 | Son | H02K 7/06 310/49.01 |
| 2003/0178897 | A1 | * | 9/2003 | Jun | H02K 7/081 310/90 |
| 2006/0220482 | A1 | * | 10/2006 | Son | H02K 7/06 310/156.08 |
| 2007/0085433 | A1 | * | 4/2007 | Agematsu | H02K 5/1672 310/90 |
| 2007/0222313 | A1 | * | 9/2007 | Sonohara | F16C 17/08 310/90 |

FOREIGN PATENT DOCUMENTS

| DE | 102004015541 | 10/2004 |
|---|---|---|
| DE | 102009000975 | 9/2009 |
| EP | 1363382 | 11/2003 |

* cited by examiner

*Primary Examiner* — Tran Nguyen
(74) *Attorney, Agent, or Firm* — Muncy, Geissler, Olds & Lowe, P.C.

(57) ABSTRACT

A linear actuator has a stator with two stator coils and pole plates forming stator poles. A rotor is rotatably mounted to interact with the stator poles. The rotor has a hollow cup shaped permanent magnet fitted to a screw shaft. An output shaft, which is co-axial with the rotor, is driven by the rotor through a screw connection. The rotor is supported by a single rotary bearing located within the magnet, axially between axial ends of the permanent magnet.

15 Claims, 2 Drawing Sheets

US 9,472,998 B2

LINEAR ACTUATOR

CROSS REFERENCE TO RELATED APPLICATIONS

This application claims the benefit of British patent application serial no. GB1222496.0, filed on Dec. 13, 2012. The entire content of the aforementioned patent application is hereby incorporated by reference for all purposes.

FIELD OF THE INVENTION

This invention relates to a linear actuator and in particular, to a suspension system for the rotor of a linear actuator.

BACKGROUND OF THE INVENTION

1. Introduction

Linear actuators comprising rotary stepper motors which transmit their rotational movement via a screw to a linear movement are popular positioning devices in automotive engineering e.g. for vehicle headlight adjustment mechanisms, due to their reliability, relatively simple manufacturability and low cost.

Linear actuators apply a force to their load in the direction of movement, that is, in the axial direction of the rotor. To counter this axial load a fixed thrust bearing is provided to support the rotor against the reaction force. Generally, the thrust bearing is directly fixed to a wall of the motor housing or is formed by a portion of the wall. The end of the shaft is either rounded or has a steel ball embedded in the end to contact the thrust plate with minimal friction.

For a vehicle headlamp adjuster, these linear actuators have to withstand high vibrations (axial and radial) and a broad temperature range (−40 to +120° C.). The linear positioning accuracy and stability should be high (<0.1 mm). Dynamic response should be in the order of 10-20 mm/s. In the position holding mode the linear actuator is preferably not excited (no electric current) but still has to resist axial forces comparable to the dynamic loads.

According to their nature, stepper motors are accelerating and decelerating with every step movement performed. The stronger the motor (necessary for a highly dynamic response) the higher the torque variations. In addition, a weakly damped rotor-stator system can oscillate around an equilibrium state at its eigenfrequencies (natural frequencies of the inertia—spring torque system). These effects lead to vibrations and noise as well as to instability (resonances).

The requirements listed above require a sophisticated actuator design. Such a design may require a high mechanical stability with reduced axial play and mechanical vibration damping.

2. Prior Art

EP 1 363 382 shows a linear actuator with a ball bearing centered on the rotor between two permanent magnet halves. This design outstandingly solves the problem of accurate radial positioning of the rotor relative to the stator. It is also fairly immune against bending/tilting of the axle as a result of radial forces. However, the accuracy of the linear output is limited by the axial play of the ball bearing. Furthermore, the separation of the rotor magnet increases the risk of angular misalignment between permanent magnet and stator poles.

DE102009000975A1 shows a linear actuator with a ball bearing centered on the rotor within a tubular magnet forming a part of the rotor. This design also solves the problem of accurate radial positioning of the rotor relative to the stator. However, there is no control over the axial play of the rotor which is dependent on the axial play of the bearing supporting the rotor. Thus axial positioning of the rotor is not tightly controlled.

U.S. Pat. No. 3,161,447 discloses a bearing arrangement for a rotatable shaft which acts as a thrust bearing to absorb axial loads and which is automatically adjusted to take up any axial play. The principle of this design is fine for the axial play reduction, but it does not allow an on-axis linear output. The radial alignment is accomplished through simple sleeve bearings, which yield higher radial tolerances and increased friction with radial loads.

U.S. Pat. No. 7,682,045 discloses a linear actuator where the rotor is axially and radially supported on the motor side (opposite to the linear output) by a bearing, which comprises a ball rigidly attached to the rotor and inserted into a cavity formed in the housing. An axial stop is pressed against the ball by means of a spring. The contact is essentially a single point contact. This has the significant disadvantage that the entire rotating part is only held at the very ends of the axle. Hence, radial accuracy in the air gap between rotor and stator is poorly satisfied. Radial loads or fabrication tolerances may result in a bent axle, which will generate noise and vibrations or even prevent rotation of the rotor. Furthermore, the invention is focused on minimizing bearing friction. It does not provide a well controlled, constant, non-zero friction over the given temperature range.

Friction in standard bearings is strongly temperature dependent related to the lubricant chosen, particularly at low temperatures. It can not be used as a constant friction brake for damping purposes.

Damping of oscillatory rotor behavior in electric motors can be accomplished through a lossy coupling with an additional inertia disc (e.g. elastomeric material as used in U.S. Pat. No. 4,800,306 or magnetic hysteresis as used in U.S. Pat. No. 4,049,985). The disadvantages include: more parts, more space, more weight, more cost, and reduced dynamic response due to higher total inertia.

Damping can also be approached with intelligent driver electronics. However, these are significantly more expensive. Many users prefer to use simple low-cost electronics and therefore need a very robust general-purpose actuator.

Hence there is a desire for a linear actuator with high mechanical stability.

SUMMARY OF THE INVENTION

Accordingly, in one aspect thereof, the present invention provides a linear actuator, comprising: a cylindrical housing having a first end and a second end; a first end cap attached to the first end of the cylindrical housing; a second end cap attached to the second end of the cylindrical housing; a stator attached to the cylindrical housing; a rotor rotatably interacting with the stator and comprising a hollow cup shaped permanent magnet and a screw shaft fixed to the hollow cup shaped permanent magnet and having a threaded end and a distal end; an output shaft co-axial and in screw coupling with the threaded end of the screw shaft, and extending through the first end cap; a bearing holder fixed to the cylindrical housing and having an end extending into the hollow cup shaped permanent magnet; a bearing attached to the end of the bearing holder within the hollow cup shaped permanent magnet to support the screw shaft; a load ball abutting the distal end of the screw shaft; a thrust bearing having a concave contact surface in contact with the load ball; and a spring attached to the second end cap and axially urging the thrust bearing towards the load ball.

Preferably, the spring urges the thrust bearing with a force approximately equal to an expected axial load to be applied to the output shaft.

Preferably, the rotor further comprises a coupler fixed to the distal end of the screw shaft and having a through hole accommodating the load ball.

Preferably, the bearing is pressed between the coupler and a shoulder formed on the screw shaft between the threaded end and the distal end.

Preferably, the concave contact surface of the thrust bearing is in frictional contact with the load ball.

Preferably, the concave contact surface of the thrust bearing includes an annular ring coaxial with an axis of the rotor.

Preferably, the bearing includes a bearing selected from the group consisting of a ball bearing, a roller bearing, and a needle bearing.

Preferably, the stator includes two bobbin wound coils.

Preferably, the first end cap has a non-circular shaped aperture; and the output shaft extending through the first end cap has a non-circular cross section corresponding to the non-circular shaped aperture.

Preferably, the bearing holder includes a plastic part injection molded directly to the bearing.

Preferably, the bearing is press-fitted onto the distal end of the screw shaft.

According to a second aspect thereof, the present invention provides a linear actuator comprising: a casing having a first end and a second end; a first end cap and a second end cap respectively disposed on the first end and second end of the casing; a stator fixed in the casing; a rotor interacting with the stator and comprising: a cup shaped permanent magnet; a rotor shaft fixed to the cup shaped permanent magnet and having a threaded section near a first end thereof; a load ball abutting a second end of the rotor shaft; and a coupler fixed to the second end of the rotor shaft and having a through hole accommodating the load ball; an output shaft co-axial and in screw coupling with the threaded section of the rotor shaft, and extending through the first end cap; a bearing holder fixed to the casing and having an end extending into the cup shaped permanent magnet; a bearing disposed on the end of the bearing holder and coupled to the rotor shaft; a thrust bearing having a concave surface in contact with the load ball; and a spring attached to the second end cap and axially pressing the thrust bearing towards the load ball.

Preferably, the concave surface of the thrust bearing is in frictional contact with the load ball.

Preferably, the concave surface of the thrust bearing includes an annular ring coaxial with an axis of the rotor.

Preferably, the bearing includes a bearing selected from the group consisting of a ball bearing, a roller bearing, and a needle bearing.

Preferably, the spring presses the thrust bearing with a force approximately equal to an expected axial load to be applied to the output shaft.

Preferably, the bearing is pressed between the coupler and a shoulder formed on the rotor shaft between the threaded section and the second end thereof.

Preferably, the bearing holder includes a plastic part injection molded directly to the bearing.

Preferably, the bearing is press-fitted onto the second end of the rotor shaft.

Preferably, the stator includes two bobbin wound coils.

Actuators of the present invention may find many uses but they are particularly useful in automotive applications and especially for adjusting the aim of headlamp assemblies, either for adjusting the vertical aim or for adjusting the horizontal aim.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
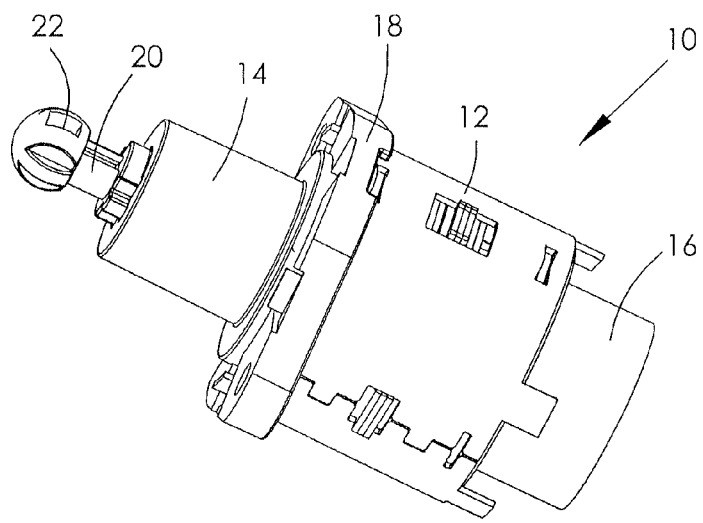
FIG. 1 is a schematic diagram illustrating a linear actuator according to the present invention.

The figures illustrate a linear actuator 10, comprising a rotary stepper motor driving a linear output shaft 20 through a screw thread connection 50. FIG. 1 is a view of the assembled linear actuator in which it can be seen that the actuator has a housing 12 (also known as a casing), an output end cap 14 fixed to a first side of the housing and an input end cap 16 fixed to a second side of the housing. The output shaft 20 is shown extending through the output end cap and having a rounded end 22

Figure 2:
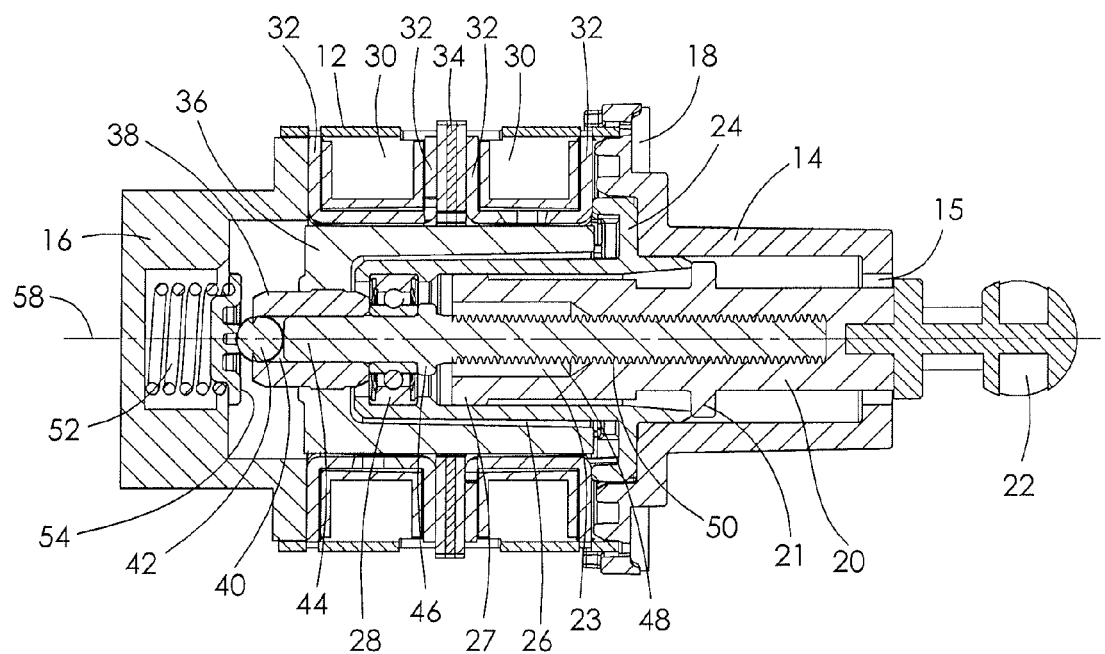
FIG. 2 is a sectional view of the linear actuator of FIG. 1.

The sectional view of FIG. 2 shows the inner structure of the actuator 10. The stepper motor has a stator and a rotor. The stator comprises two stator coils 30, preferably bobbin wound coils, fitted to pole plates 32 which together with the housing 12 form part of the magnetic flux path of the motor. Optionally, additional detent plates 34 may be placed between the coils 30 to increase the detent torque or holding torque of the rotor when the motor is not energized. The detent plates, as well as the stator poles, face towards and interact with the rotor. The rotor comprises an annular ring magnet 36 having a plurality of magnet poles arranged to interact with the stator poles, as is generally known in the art. The rotor magnet 36 is fixed to a rotor shaft. The rotor shaft comprises a rotor coupler 38 and a screw shaft 44 fixed to the rotor coupler, preferably as a press fit into a through hole 40 of the rotor coupler.

A single rotor bearing 28 is fixed to the screw shaft 44, sandwiched between the rotor coupler 38 and a shoulder 46 on the screw shaft 44. The bearing 28 is supported by a bearing holder 24 forming a part of the output end cap 14 and extends inside of the rotor magnet 36 such that the bearing 28 is physically located within the rotor magnet 36. Thus, while the rotor is supported by a single bearing, it is not a true cantilever support. Ideally, the location of the bearing is approximately at the balance point of the rotor, including the screw shaft so that the rotor has a lower risk of radial deflections than in a true cantilevered arrangement. The stresses on the bearing 28 are also less and thus the expected life of the bearing is greater. Preferably the bearing 28 is a ball bearing, although a roller bearing could be used. Preferably, the bearing holder 24 is a plastic injection molded part that is molded directly to the bearing 28.

The screw shaft 44 is connected to the output shaft 20 via a screw connection 50. The screw shaft 44 has a screw thread 48 formed on the outer surface of the shaft, preferably over the majority of its free surface on the side of the shoulder 46 remote from the bearing 28 and the rotor coupler 38. The output shaft has an axial bore 23 for receiving the threaded end of the screw shaft and at least a portion of the bore has an internal thread which engages the thread of the screw shaft, as a nut engages a bolt, to form the threaded connection 50. The output shaft 20 is able to slide axially through the output end cap 14 but is restricted or prevented from rotating with the screw shaft 44. Thus as the screw shaft turns, the screw thread connection drives the output shaft axially along the screw shaft 44. An anti-rotation mechanism may be formed by one or more axially extending grooves 26 formed in the bearing holder 24 and arranged to receive a projection 27 formed on the outer surface of the output shaft 20. The grooves 26 allow the projections 27 to move axially along the grooves, while preventing rotation of the output shaft.

A stop 21 in the form of an annular radial projection is also provided at a position along the length of the output shaft to limit the range of motion of the output shaft. In the retracted position as shown in FIG. 2, the stop 21 bears against the bearing holder 24 to prevent further inward movement of the output shaft. In the fully extended position, the stop 21 bears against an inner surface of the output end cap 14 adjacent the aperture 15 for the output shaft to prevent further outward movement of the output shaft.

To support the rotor against the reaction force from the load, a ball 42, preferably a steel ball, is pressed into the through hole 40 of the rotor coupler 38 and abuts the screw shaft 44. The ball protrudes from the through hole and is arranged to contact a thrust bearing 54. To avoid or minimize end play (free movement of the rotor in the axial direction), the thrust bearing 54 is floating, being biased by a spring 52 to provide an axial preload on the rotor. This preload is preferably approximately equal to the expected maximum axial loading of the output shaft so that the rotor is always pressed against the bearing 28 except in an overload situation, thus removing the axial play of the bearing in the positioning of the load. In addition, to increase the holding force of the rotor when the actuator 10 is not energized, the contact surface of the thrust bearing 54 is not planar but provides a contact surface which contacts the ball, not as a point contact on the axis of the rotor, but as a large surface contact, preferably as an annular ring surface coaxial with but spaced from the axis of the rotor. This is achieved by a friction ring 56 being formed on the thrust bearing 54 and arranged to contact the ball 42. The frictional force of the thrust surface can be adjusted to modify the holding force by changing the size of the contact surface, the location of the contact between the ball 42 and the surface of the thrust bearing 54 and the material of the thrust bearing surface. The holding force created by the thrust bearing supplements holding forces created by other measures such a cogging torque and magnetic detent torque created by the stator pole plates 32 and any magnetic detent plates 34 shown disposed between the two coils 30 of the stator, which react with the magnetic field created by the rotor magnet to hold the rotor stationary when the actuator 10 is not energized.

As will be appreciated from reading the above, an axial force is applied to the screw shaft 44 by means of a preloaded spring 52 via a thrust plate 54 and a ball 42 having a predetermined frictional contact. That predetermined axial force removes the axial play within the bearing 28 and is in the order of the maximum axial force for which the actuator 10 was designed (e.g. 20 N).

At the same time a preferably constant friction torque is created between the thrust plate 54 and the ball 42. The frictional contact area is ring-like. The magnitude of the friction torque can therefore be easily customized. The mechanical friction is adjusted for proper damping. Together with the magnetic detent between the stator and the rotor, the resulting torque yields the required (non-excited) holding torque.

Forces (axial and radial) between actuator mounting flange 18 and output shaft 20 are acting only between the flange 18—bearing holder 24—bearing 28—screw shaft 44—output shaft 20. These forces are not applied to the rotor or to the stator. The rotor is axially preloaded through the spring 52 but is negligibly affected by external forces. In the same way, external loading forces have negligible affect on the stator. Hence, the motor stability (air-gap between rotor-stator) is not affected by external load conditions.

The main ball bearing 28 is inside the rotor and fairly central to the motor, which means that the risk for radial deflections is low and thus the rotor and stator tolerances can be relaxed.

In operation, the rotor is electromagnetically driven by the stator. It is coupled to the screw shaft 44 via the rotor coupler 38. A bearing 28 with an over molded bearing holder 24 part is press-fitted onto the screw shaft 44. The bearing holder 24 is rigidly mounted between stator and actuator flange 18. The output shaft 20 is rotationally fixed but moves linearly upon rotation of the screw shaft.

Figure 3:
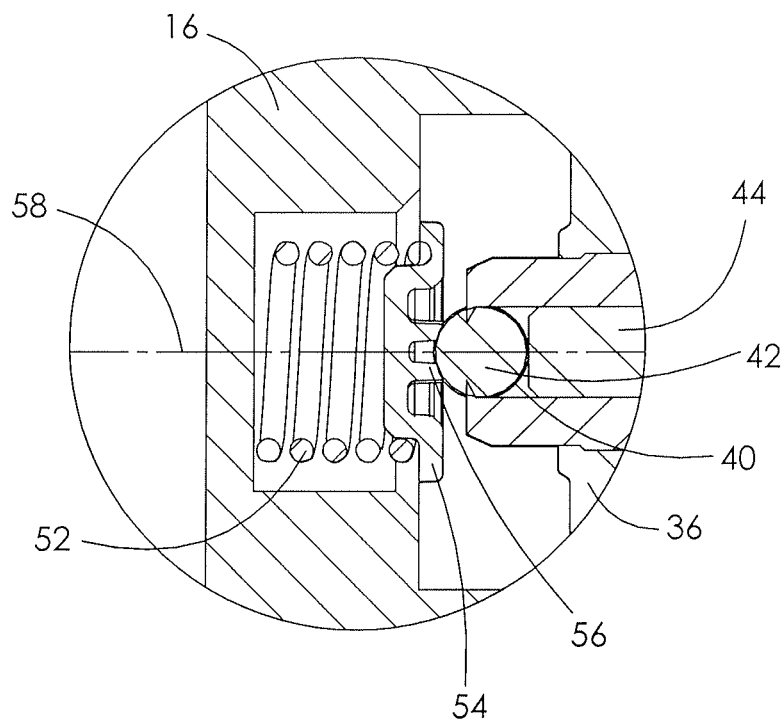
FIG. 3 is an enlarged view of a portion of FIG. 2.

The arrangement of the axial pre-load is shown in greater detail in FIG. 3. The ball 42 is mounted on-axis in the through hole 40 of the rotor coupler 38. The preloaded spring 52 presses the thrust bearing 54 against the ball. The thrust bearing 54 has a friction ring 56 formed as part of the thrust bearing 54, and forming the contact surface which creates friction with the surface of the ball. The frictional contact area is thus ring-like. This arrangement produces a greater frictional contact compared to the usual thrust bearing arrangement where the ball (usually a ball of a material with a high hardness such as steel) is pressed against a planar surface of a thrust plate (also usually of steel) producing a low friction point contact between the ball and the thrust bearing. In the present invention, the friction of the thrust bearing is deliberately made high to increase the holding force or static friction when the motor is not being operated.

Figure 4:
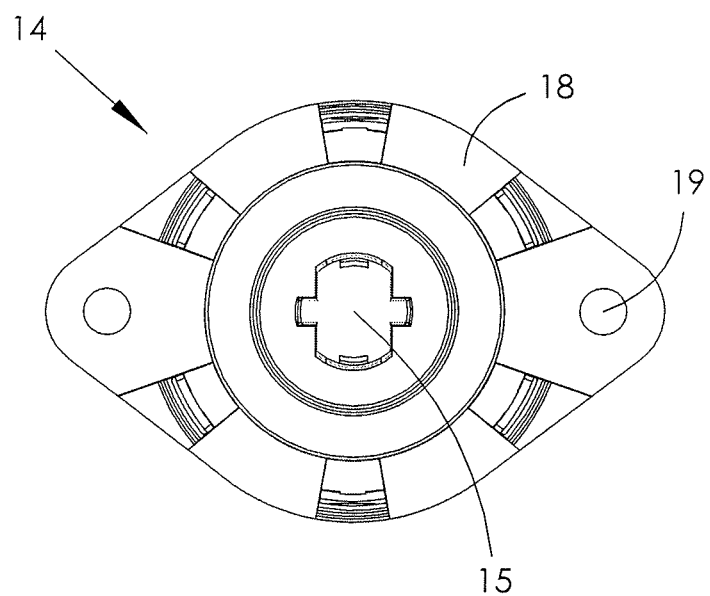
FIG. 4 illustrates an end bracket of the linear actuator.

The output end cap 14 of the actuator 10, that is the end cap adjacent the output shaft, is shown in FIG. 4 to illustrate an alternative method of preventing the output shaft from rotating with the rotor. The aperture 15 in the end cap 14 through which the output shaft 20 passes has a non-circular shape and the output shaft has a shape, such that the output shaft can not rotate within the aperture. While it is preferred that the shape of the aperture and the portion of the output shaft which slides through the aperture are complimentary, it is not essential that they directly correspond, just so long as the output shaft can slide through the aperture but can not rotate about the rotor axis 58 within the aperture.

FIG. 4 also shows the mounting flange 18 which is formed as a part of the output end cap 14. The mounting flange has two holes 19 for screws to fix the linear actuator 10 to the apparatus or mounting surface as require for use of the actuator 10.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, the ball of the rotor could be replaced by a rounded end of the coupler shaft. Also, while the single bearing has been described as a ball bearing, it may be a roller bearing, a needle bearing or a combination bearing. It may also be a combination of bearings.

The invention claimed is:

1. A linear actuator, comprising:
a cylindrical housing having a first end and a second end;
a first end cap attached to the first end of the cylindrical housing;
a second end cap attached to the second end of the cylindrical housing;
a stator attached to the cylindrical housing;
a rotor rotatably interacting with the stator and comprising a hollow cup shaped permanent magnet and a screw shaft fixed to the hollow cup shaped permanent magnet and having a threaded end and a distal end;
an output shaft co-axial and in screw coupling with the threaded end of the screw shaft, and extending through the first end cap;
a bearing holder fixed to the cylindrical housing and having an end extending into the hollow cup shaped permanent magnet;
a bearing attached to the end of the bearing holder within the hollow cup shaped permanent magnet to support the screw shaft;
a load ball abutting the distal end of the screw shaft;
a thrust bearing having a concave contact surface in contact with the load ball; and
a spring attached to the second end cap and axially urging the thrust bearing towards the load ball,
wherein the rotor further comprises a coupler fixed to the distal end of the screw shaft and having a through hole accommodating the load ball, the bearing is pressed between the coupler and a shoulder formed on the screw shaft between the threaded end and the distal end.

2. The actuator of claim 1, wherein the concave contact surface of the thrust bearing is in frictional contact with the load ball.

3. The actuator of claim 2, wherein the concave contact surface of the thrust bearing includes an annular ring coaxial with an axis of the rotor.

4. The actuator of claim 1, wherein the bearing includes a bearing selected from the group consisting of a ball bearing, a roller bearing, and a needle bearing.

5. The actuator of claim 1, wherein the stator includes two bobbin wound coils.

6. The actuator of claim 1, wherein:
the first end cap has a non-circular shaped aperture; and
the output shaft extending through the first end cap has a non-circular cross section corresponding to the non-circular shaped aperture.

7. The actuator of claim 1, wherein the bearing holder includes a plastic part injection molded directly to the bearing.

8. The actuator of claim 1, wherein the bearing is press-fitted onto the distal end of the screw shaft.

9. A linear actuator, comprising:
a casing having a first end and a second end;
a first end cap and a second end cap respectively disposed on the first end and second end of the casing;
a stator fixed in the casing;
a rotor interacting with the stator and comprising:
a cup shaped permanent magnet;
a rotor shaft fixed to the cup shaped permanent magnet and having a threaded section near a first end thereof;
a load ball abutting a second end of the rotor shaft; and
a coupler fixed to the second end of the rotor shaft and having a through hole accommodating the load ball;
an output shaft co-axial and in screw coupling with the threaded section of the rotor shaft, and extending through the first end cap;
a bearing holder fixed to the casing and having an end extending into the cup shaped permanent magnet;
a bearing disposed on the end of the bearing holder and coupled to the rotor shaft;
a thrust bearing having a concave surface in contact with the load ball; and
a spring attached to the second end cap and axially pressing the thrust bearing towards the load ball,
wherein the bearing is pressed between the coupler and a shoulder formed on the rotor shaft between the threaded section and the second end thereof.

10. The actuator of claim 9, wherein the concave surface of the thrust bearing is in frictional contact with the load ball.

11. The actuator of claim 10, wherein the concave surface of the thrust bearing includes an annular ring coaxial with an axis of the rotor.

12. The actuator of claim 9, wherein the bearing includes a bearing selected from the group consisting of a ball bearing, a roller bearing, and a needle bearing.

13. The actuator of claim 9, wherein the bearing holder includes a plastic part injection molded directly to the bearing.

14. The actuator of claim 9, wherein the bearing is press-fitted onto the second end of the rotor shaft.

15. The actuator of claim 9, wherein the stator includes two bobbin wound coils.

* * * * *